US007503528B2

(12) United States Patent
Adams et al.

(10) Patent No.: US 7,503,528 B2
(45) Date of Patent: Mar. 17, 2009

(54) CABLE MOUNT

(75) Inventors: Michael Scott Adams, Suwanee, GA (US); Kevin Larry Nelson, Cumming, GA (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 11/836,255

(22) Filed: Aug. 9, 2007

(65) Prior Publication Data

US 2008/0035801 A1 Feb. 14, 2008

Related U.S. Application Data

(60) Provisional application No. 60/822,090, filed on Aug. 11, 2006.

(51) Int. Cl.
*F16B 15/00* (2006.01)
(52) U.S. Cl. .............................. 248/71; 24/297; 24/453; 248/74.1; 411/508; 411/913
(58) Field of Classification Search .................. 248/71, 248/74.1, 74.2, 74.3; 411/508, 509, 510, 411/913; 24/297, 453
See application file for complete search history.

(56) References Cited

U.S. PATENT DOCUMENTS

| 3,632,071 A | * | 1/1972 | Cameron et al. ............ 248/74.3 |
| 4,261,243 A | * | 4/1981 | Palmer ........................ 411/510 |
| 4,396,329 A | | 8/1983 | Wollar |
| 4,402,641 A | | 9/1983 | Arff |
| 4,776,739 A | | 10/1988 | Hamman |
| 4,865,281 A | * | 9/1989 | Wollar .......................... 248/71 |
| 4,936,530 A | * | 6/1990 | Wollar .......................... 248/71 |
| 5,150,865 A | * | 9/1992 | Miller .......................... 248/71 |
| 5,306,098 A | | 4/1994 | Lewis |
| 5,368,261 A | * | 11/1994 | Caveney et al. ............... 248/73 |
| 5,759,004 A | * | 6/1998 | Kuffel ......................... 411/508 |
| 5,907,891 A | | 6/1999 | Meyer |
| 5,921,510 A | | 7/1999 | Benoit et al. |
| 6,719,513 B1 | * | 4/2004 | Moutousis et al. .......... 411/510 |
| 2002/0109050 A1 | | 8/2002 | Winton, III |
| 2003/0189140 A1 | | 10/2003 | Takeuchi |
| 2005/0242247 A1 | | 11/2005 | Geiger |

* cited by examiner

*Primary Examiner*—Ramon O Ramirez
(74) *Attorney, Agent, or Firm*—Robert A. McCann; Christopher S. Clancy

(57) ABSTRACT

A cable mount for receiving and carrying cable bundles comprises a shaft and a cable tie receiving member. The shaft comprises a top end portion and a bottom end portion and first and second adjacent projections spaced apart along a longitudinal axis of the shaft. The adjacent projections extend radially from the shaft and are circumferentially displaced about the longitudinal axis relative to one another. The cable tie receiving member comprises a top surface and opposing sidewalls defining a slot to receive a cable tie. The cable tie receiving member is positioned at the top end portion of the shaft.

25 Claims, 7 Drawing Sheets

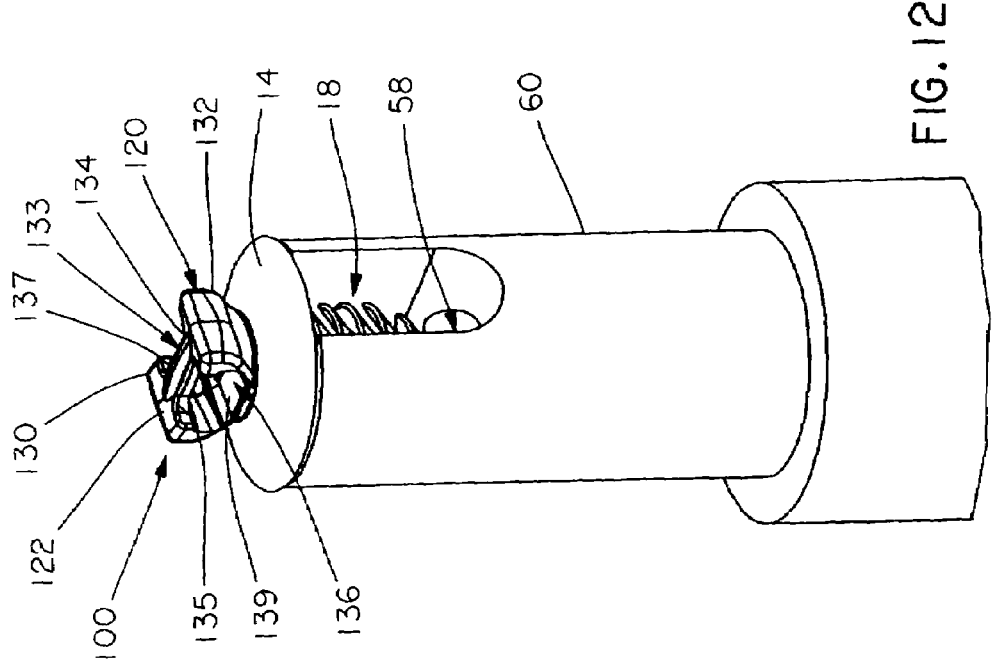
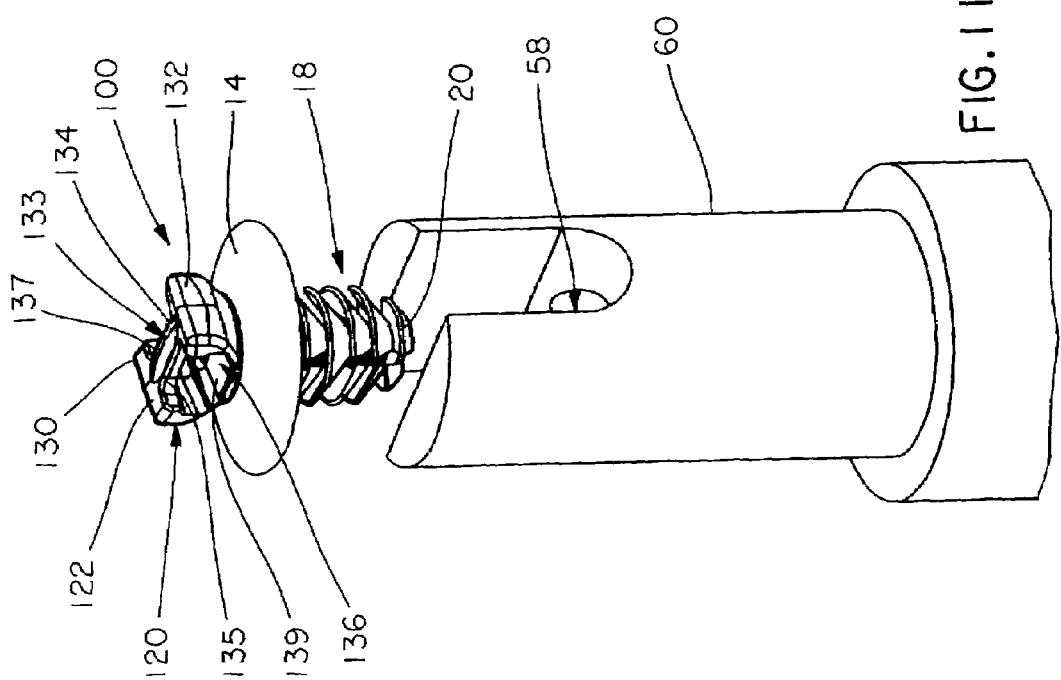

CABLE MOUNT

FIELD OF THE INVENTION

The present invention relates to cable mounts and, more particularly, to cable mounts comprising fastener members for securement in an aperture of a workpiece.

BACKGROUND

A variety of cable mounts exist for securing cable bundles to a workpiece. One such cable mount, often referred to as a Christmas tree or fir tree cable mount, comprises a cable tie receiving member and a fastener member comprising a shaft with a plurality of radially extending flexible projections. This device has been used in assembly fixtures for harness boards and in panels constructed of sheet metal found in automobile engine compartments and doors.

There is need for a cable mount that can be used with sheet metal panels comprising varying thickness and hole sizes.

SUMMARY

The present invention relates to an improved cable mount and methods for using the same.

In one embodiment, a cable mount for receiving and carrying cable bundles comprises a shaft and a cable tie receiving member. The shaft comprises a top end portion and a bottom end portion and first and second adjacent projections spaced apart along a longitudinal axis of the shaft. The adjacent projections extend radially from the shaft and are circumferentially displaced about the longitudinal axis relative to one another. The cable tie receiving member comprises a top surface and opposing sidewalls defining a slot to receive a cable tie. The cable tie receiving member is positioned at the top end portion of the shaft.

In another embodiment, a cable mount for receiving and carrying cable bundles comprises a shaft and a cable tie receiving member. The shaft comprises a top and bottom end portions and a longitudinal axis positioned within a plane extending along the shaft. The plane separates the shaft into a first side and a second side. The shaft further comprises a plurality of projections extending radially therefrom with each projection extending circumferentially around a portion of the shaft between about 120° and 160°. In addition, two or more adjacent projections positioned on one of the first and second sides of the plane are circumferentially displaced about the longitudinal axis relative to one another. The cable tie receiving member is positioned at the top end portion of the shaft and comprises a top surface and opposing sidewalls defining a slot to receive a cable tie.

The various embodiments of the cable mount may incorporate additional features. The shaft may, for example, comprise a plurality of adjacent projections, with adjacent projections circumferentially displaced about the longitudinal axis relative to one another, thereby creating a row of alternating projections along each side of said shaft. The projections of the shaft may comprise arcuate upwardly angled protrusions and be circumferentially displaced about the longitudinal axis by between about 5° and 20°. The cable tie receiving member may further comprise a retention tab for resisting movement of a cable tie positioned within its slot. Further, the cable tie receiving member may comprise raised outer edges connected by a bridge comprising opposing sidewalls, and the raised outer edges and the opposing sidewalls define one or more open spaces. The top surface of the cable tie receiving member may alternatively comprise a concave surface with raised outer edges and a flange. The cable mount itself may further comprise a crown connected to the top end portion of the shaft. The crown may comprise a flexible disc extending outwardly from the shaft and exhibit a frusto-conical shape. A bottom portion of the crown may comprise centering tabs for centering the cable mount within an aperture. Finally, the bottom end portion may comprise a wedge positioned at the bottom end portion comprising opposing projections. Typically, the opposing projections comprise a smaller width dimension and greater thickness than the first and second projections of the shaft.

BRIEF DESCRIPTION OF THE DRAWINGS

Certain embodiments of the present invention are illustrated by the accompanying figures. It should be understood that the figures are not necessarily to scale and that details not necessary for an understanding of the invention or that render other details difficult to perceive may be omitted. It should be understood, of course, that the invention is not necessarily limited to the particular embodiments illustrated herein.

FIG. 11 is a perspective view of the cable mount of FIG. 7 being installed into an aperture of an assembly frame:

FIG. 12 is a perspective view of the cable mount of FIG. 7 installed into an aperture of an assembly frame.

DETAILED DESCRIPTION

Figure 1:
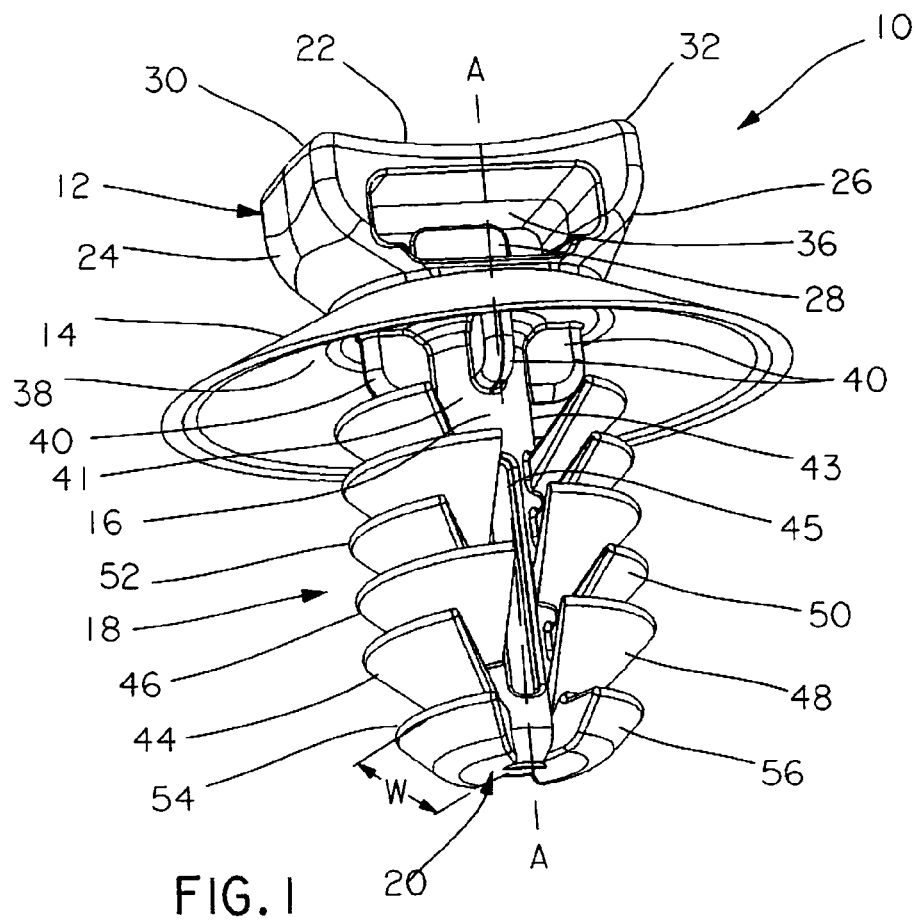
FIG. 1 is a front perspective view of one embodiment of the cable mount of the present invention.
Figure 2:
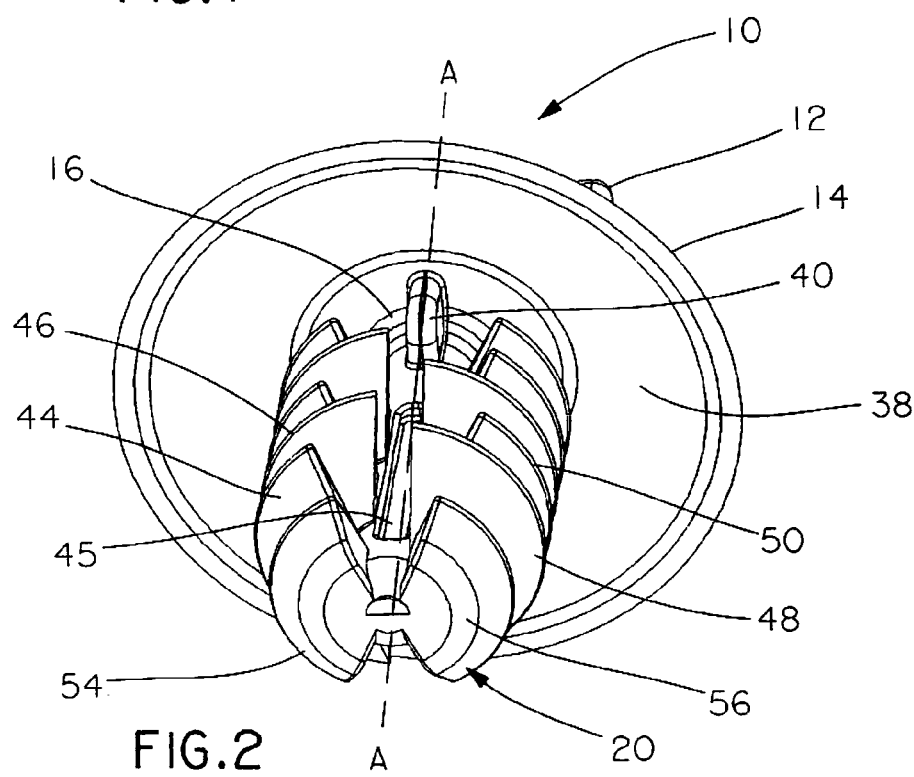
FIG. 2 is a bottom perspective view of FIG. 1.
Figure 3:
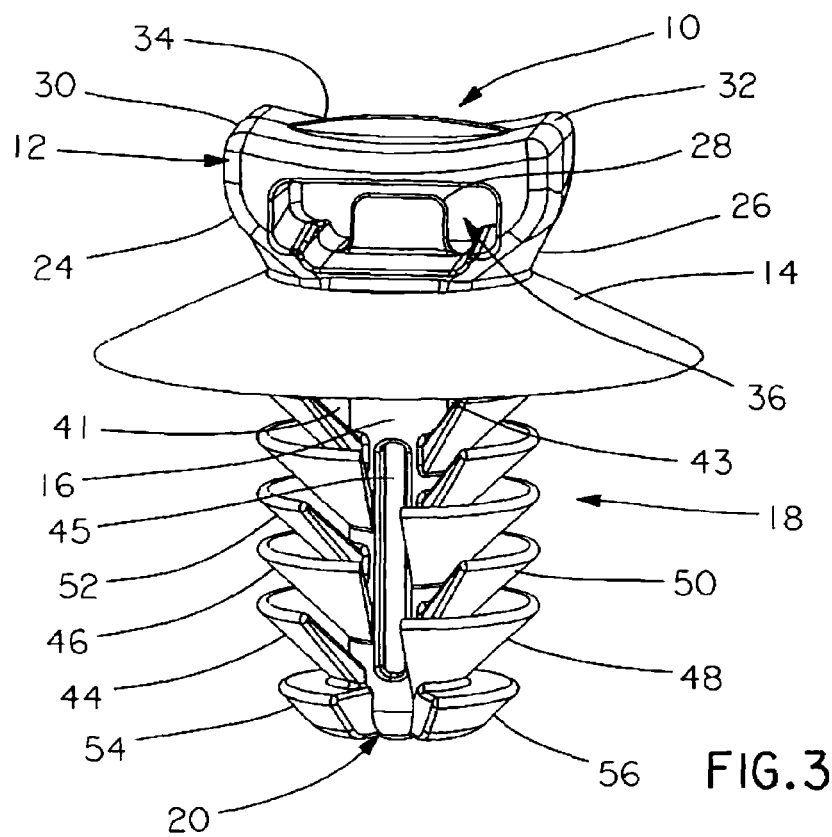
FIG. 3 is a top perspective view of FIG. 1.
Figure 4:
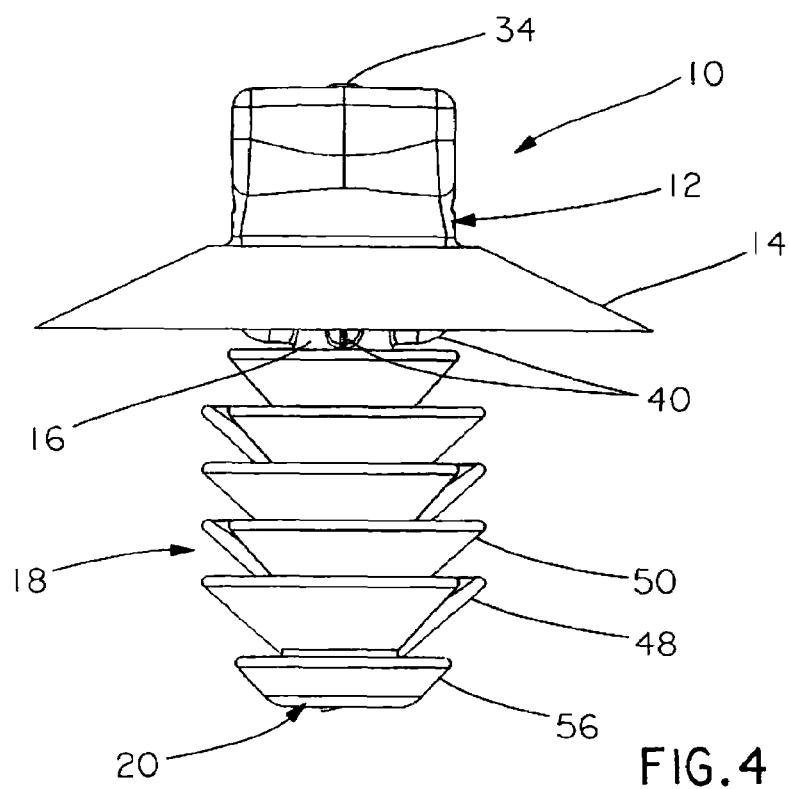
FIG. 4 is a side elevational view of FIG. 1.

Referring now to FIGS. 1-3, cable mount 10 comprises cable tie receiving member 12, crown 14, shaft 16, plurality of projections 18 and end wedge 20.

Figure 5:
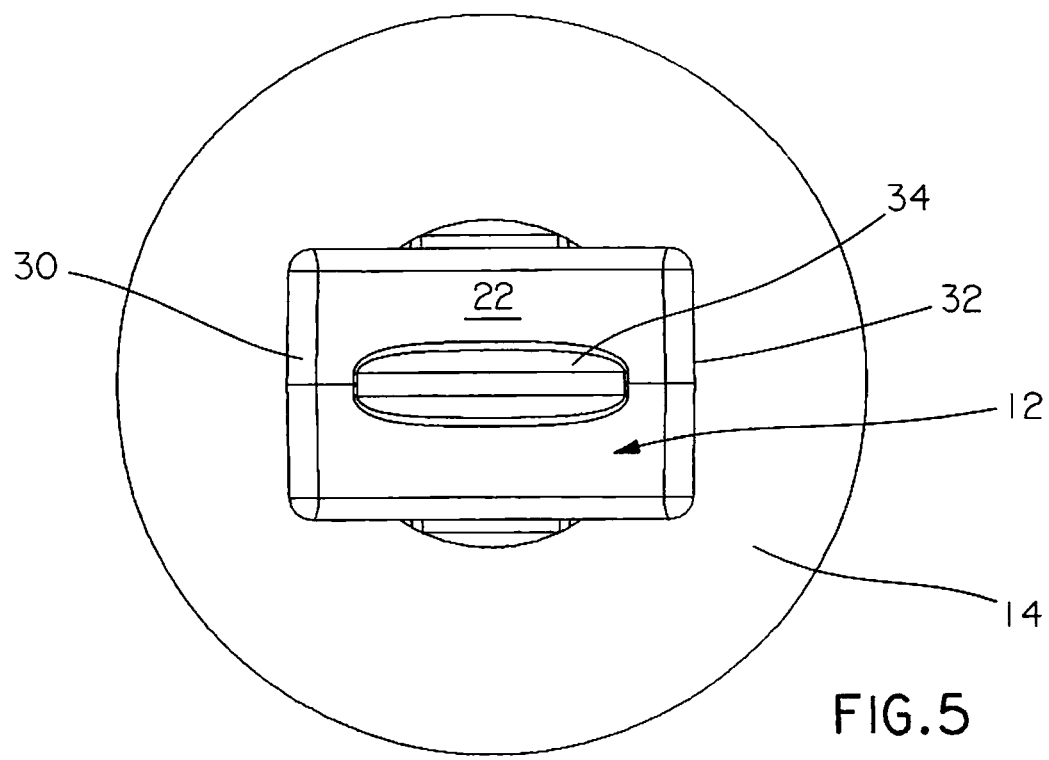
FIG. 5 is a top plan view of FIG. 1.
Figure 6:
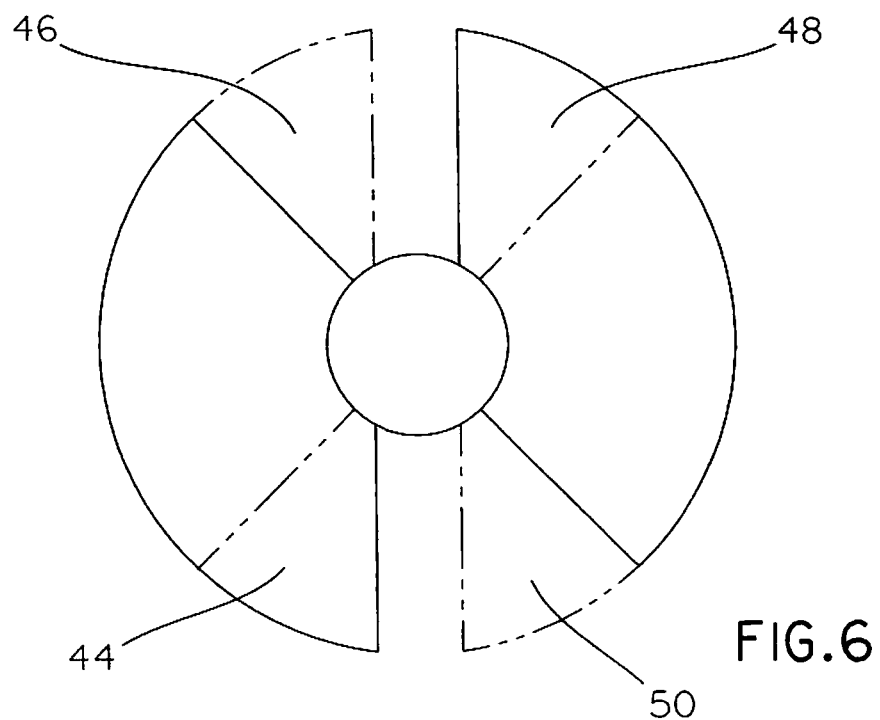
FIG. 6 is a bottom plan view of two adjacent circumferentially displaced projections of the cable mount of FIG. 1.
Figure 10:
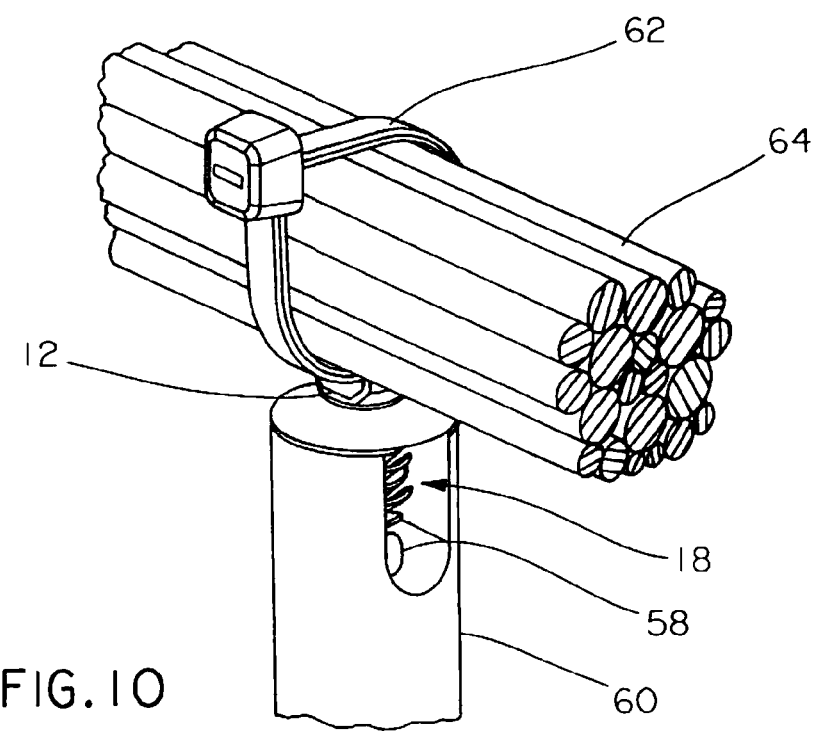
FIG. 10 is a perspective view of the cable mount of FIG. 1 engaged with the assembly fixture of FIG. 7 and carrying a cable bundle.
Figure 13:
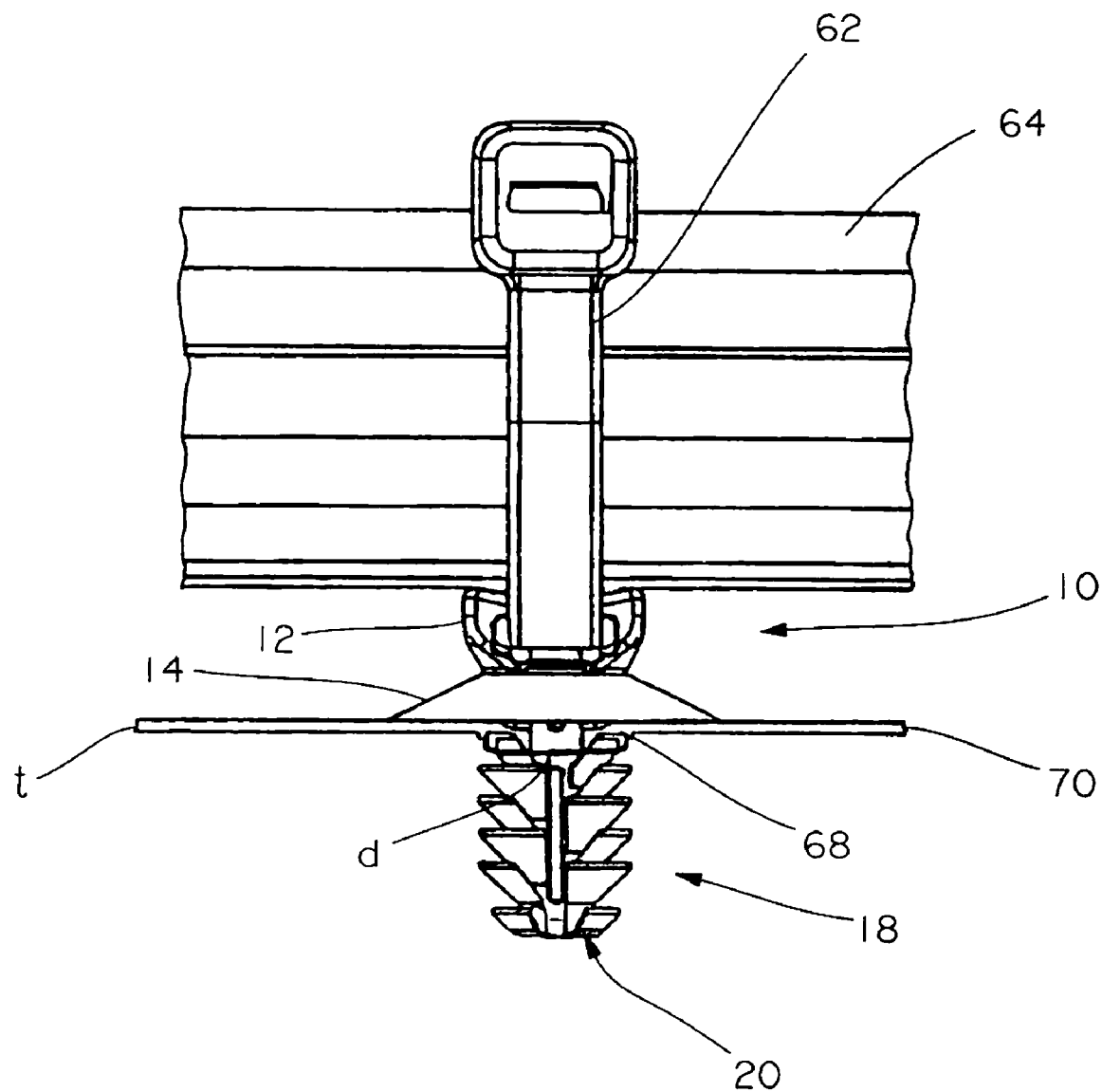
FIG. 13 is a side elevational view of the cable mount of FIG. 1 carrying a cable bundle and engaged with a sheet metal panel, shown in partial cross-section.

Cable tie receiving member 12 comprises top surface 22, sidewalls 24 and 26 and cable tie retention tab 28. Top surface 22 may comprise a concave surface with raised outer edges 30 and 32 and may further comprise flange 34 (FIGS. 3 & 5). Raised outer edges 30 and 32 help prevent translational movement of cable bundles installed on cable mount 10, while flange 34 helps prevent rotational movement of the same. Top surface 22 and sidewalls 24 and 26 define slot 36, adapted to receive a cable tie, such as cable tie 62 (FIGS. 10 & 13). Retention tab 28 is designed to prevent movement of cable tie 62 in slot 36. Retention tab 28 may be positioned on the top or bottom of slot 36 depending on the type of cable tie employed.

Crown 14, connected to cable tie receiving member 12 and shaft 16, acts as a spring to help prevent movement of cable mount 10 after installation. Crown 14 comprises a flexible disc extending downwardly and outwardly from cable tie receiving member 12. Although crown 14 is shown as comprising a frusto-conical shape, it can exhibit various other shapes and structures, including a pyramidal shape. Bottom portion 38 of crown 14 may comprise centering tabs 40 for centering cable mount 10 within an aperture to help ensure engagement of plurality of projections 18 during installation.

Shaft 16 comprises longitudinal axis A positioned within a plane extending along shaft 16. The plane separates shaft into first side 41 and second side 43. Shaft may further comprise groove 45. The purpose of groove 45 is to facilitate the manufacturing process described hereinbelow.

Plurality of projections 18 may exhibit various configurations and arrangements. Projections 18 are typically formed as arcuate upwardly angled protusions on first and second sides 41 and 43 of shaft 16. Each projection 18 typically extends circumferentially around a portion of shaft 16 between about 120° and about 160°. Projections 18 may, however, exhibit other shapes and sizes, including warped, wavy or other constructions known to those of skill in the art.

In one embodiment, projections 18 comprise first and second adjacent projections 44 and 46 spaced apart along longitudinal axis A and extending radially therefrom. First and second adjacent projections 44 and 46 are positioned on first side 41 of shaft 16. As best seen in FIG. 2, second projection 46 may be circumferentially displaced about longitudinal axis A relative to first projection 44 and overlie at least a portion thereof. For example, second projection 46 may be circumferentially displaced about longitudinal axis A relative to first projection 44 by between about 5° and about 20° and, more particularly, by between about 10° and about 15°. Opposing first and second projections 48 and 50 are positioned on second side 43 of shaft 16.

Additionally, third projection 52 may overlie second projection 46 and be aligned with first projection 44, such that a row of projections 18 along one side of shaft 16 exhibits an alternating pattern as shown in FIG. 2. That is, adjacent first and second projections 44 and 46 along one of first and second sides 41 and 43 of shaft 16 are offset from one another while projections 18 separated by a single intervening projection are aligned with one another (e.g., projections 44 and 52). This alternating pattern helps prevent successive projections 18 from touching when projections 18 flex during insertion, thereby decreasing the amount of insertion force necessary to achieve engagement with a workpiece.

End wedge 20, positioned opposite cable tie receiving member 12, comprises symmetrical opposing projections 54 and 56. Opposing projections 54 and 56 comprise a smaller width dimension W than plurality of projections 18, thereby allowing end wedge 20 to act as a lead-in during insertion of cable mount 10 into a workpiece. The thickness of opposing projections 54 and 56 on end wedge 20, on the other hand, is greater than that of plurality of projections 18, thereby increasing the amount of force necessary to free cable mount 10 after installation.

Figure 7:
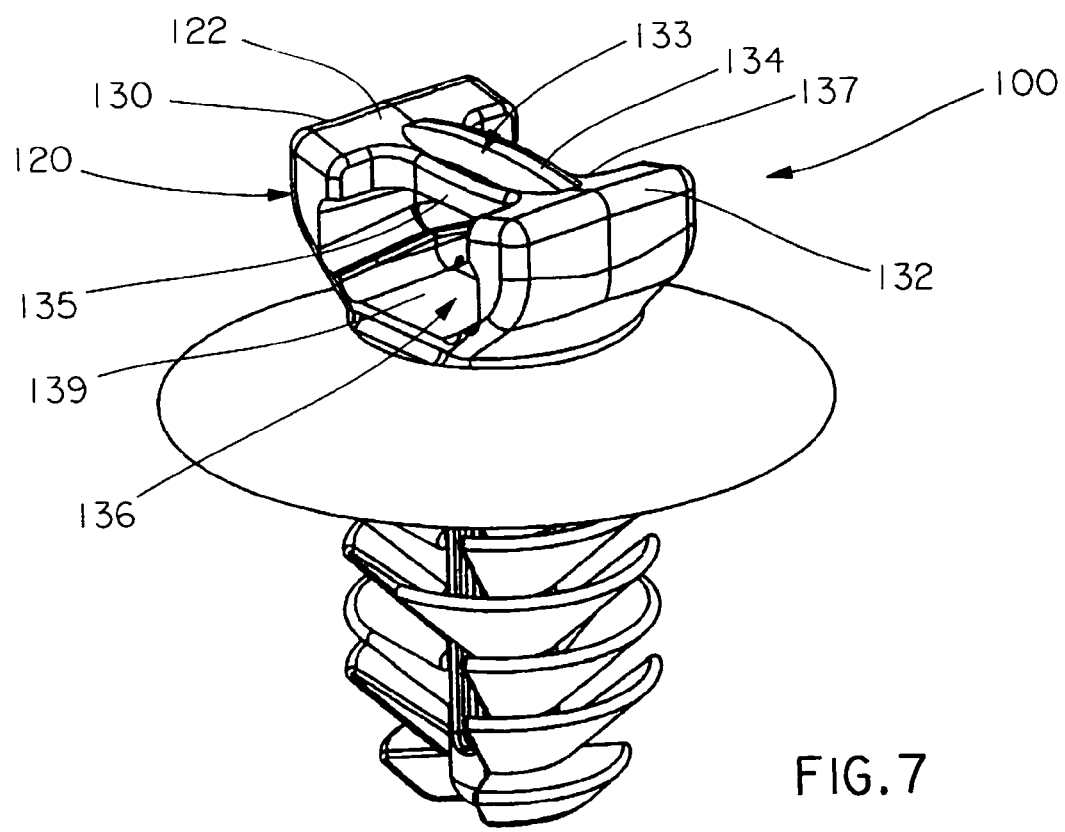
FIG. 7 is a perspective view of an alternate embodiment of the cable mount of FIG. 1 with a modified cable tie receiving member.
Figure 8:
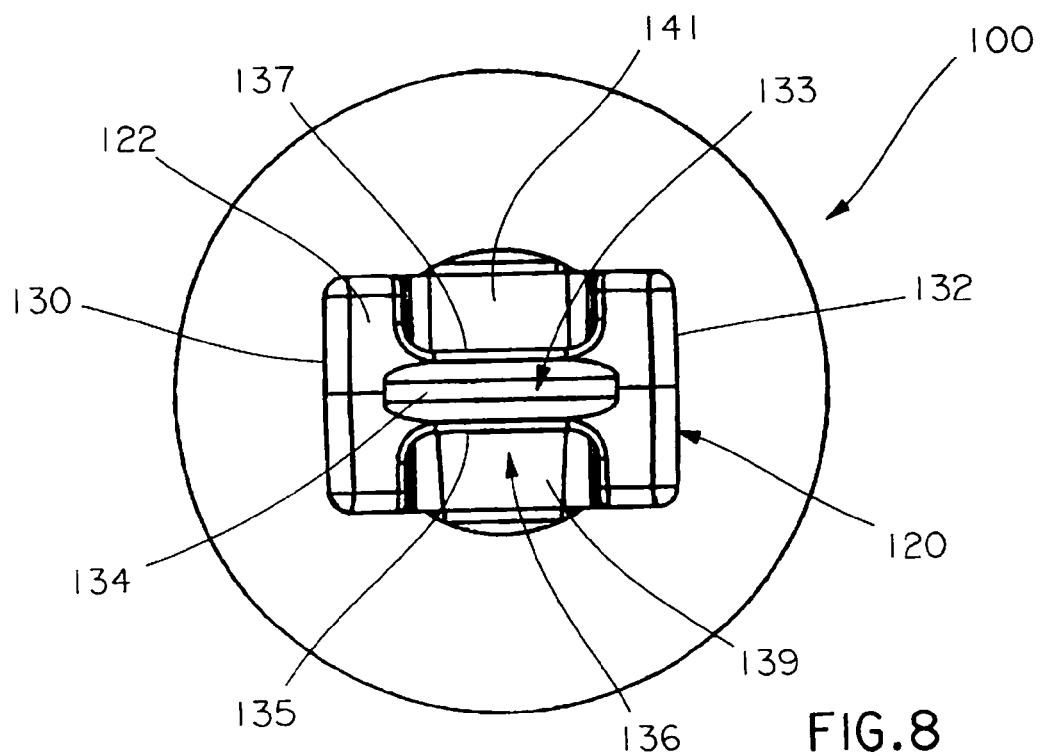
FIG. 8 is a top plan view of FIG. 7.

An alternate embodiment of cable mount 100 is illustrated in FIGS. 7 and 8. Cable mount 100 shares the same structure and features as cable mount 10, except with respect to cable tie receiving member 120. In cable mount 100, top surface 122 of cable tie receiving member 120 comprises raised outer edges 130 and 132 connected by bridge member 133, comprising flange 134 and opposing sidewalls 135 and 137. Raised outer edges 130 and 132 and opposing sidewalls 135 and 137 define open spaces 139 and 141. As shown in FIGS. 7 and 8, open spaces 139 and 141 are U-shaped, though they may exhibit alternate configurations, such as C-shaped or otherwise. Open spaces 139 and 141 help minimize interference with cable ties and cable mount 100 as the ties pass through cable mount 100. Open spaces 139 and 141 also advantageously enable a decrease in the height of cable mount 100 while still allowing cable ties to pass through slot 136. Such a configuration is useful when space constraints are present.

Cable mounts 10 or 100 may be injection molded as one piece. Mounts 10 and 100 are typically constructed of a flexible material, such as polyamide Nylon 6.6.

In operation, cable mounts 10 and 100 may be installed within an aperture of a workpiece. The workpiece may be an assembly fixture for a harness board that routes and manages wires or a sheet metal panel in an automobile engine compartment or door. The workpiece 60 shown in FIGS. 9-12 is an assembly fixture, and the workpiece 70 shown in FIG. 13 is a sheet metal panel. Co-pending co-owned patent application No. 11/248,568. hereby incorporated by reference includes additional views of harness boards for use with cable mounts 10 and 100.

The shape and configuration of projections 18 advantageously enable temporary insertion of mount 10 into assembly fixtures (i.e., mount 10 can be readily inserted into and removed from such fixtures) and permanent securement to sheet metal panels comprising apertures of appropriate dimensions. By "permanent securement." it is meant that mount 10 cannot be removed without damage or destruction thereto. Diameter d of aperture 68 within the sheet metal panel may vary between about 2.5 mm and 25.5 mm, but is preferably slightly smaller than the distance across respective opposing projections 44 and 48 or 46 and 50 (distance D). Thickness t of sheet metal panel is likewise variable, between about 0.5 mm and about 10.0 mm for example. Cable mount 10 is adapted to function across a wide range of aperture diameters and panel thickness:

| Distance Across Projections D | Hole Diameter d | Panel Thickness t |
|---|---|---|
| 5.8 mm | 4.6-4.9 mm | 0.7-3 mm |
| 7.7 mm | 6.3-7.1 mm | 0.8-7 mm |
| 10.6 mm | 9-10 mm | 0.8-7 mm |

As shown above, a single cable mount 10 is adapted for engagement with sheet metal panels comprising apertures with varying diameters and thicknesses. The diameters may vary by between about 0.25 mm and about 1.0 mm and the thickness may vary by between about 2.0 mm and about 6.25 mm.

Figure 9:
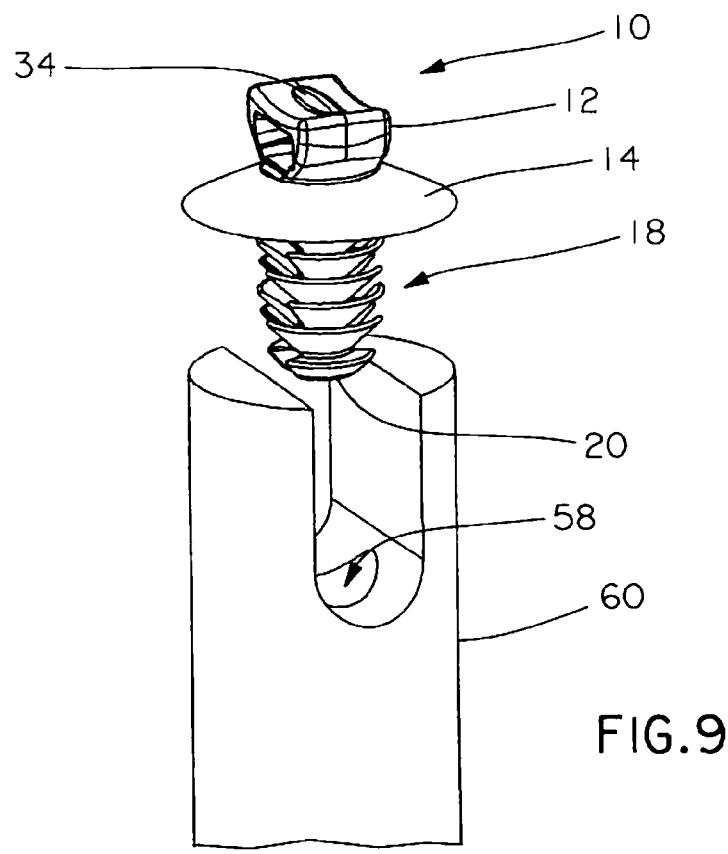
FIG. 9 is a perspective view of the cable mount of FIG. 1 being installed into an aperture of an assembly fixture.

As shown in FIGS. 9, 10 and 13, cable mount 10 is inserted into aperture 58 of workpiece 60 and aperture 68 of workpiece 70. Cable mount 10 is placed within apertures 58 and 68 and aligned therein by centering tabs 40. Cable mount 10 can be driven into apertures 58 and 68 by hand or with tools (e.g., a rubber mallet). During insertion into workpiece 60, projections 18 distort or flex upwardly against sidewalls of aperture 58, thereby decreasing the amount of force necessary to insert cable mount 10 into aperture 58. Due to their resilient construction, at least some projections 18 return to their unflexed state after insertion to create an interference fit that helps prevent release of cable mount 10 from aperture 58. In this way, projections 18 increase the amount of force necessary to extract cable mount 10 from aperture 58. The insertion force required to insert cable mount 10 into workpiece 70 is typically between about 8.0 pounds and 20.0 pounds, with 12.0 pounds or less being typical. Insertion force is measured with a tensile and compression force tester, such as an Instron Model No. 1011. by Instron Corp. of Norwood. Mass.

FIGS. 10 and 13 illustrate an elongated cable tie 62 threaded through slot 36 of cable mount 10 and secured around cable bundle 64. The tie 62 is inserted through slot 36 and moved forward or backward as necessary. Retention tab 28 resists translational movement of cable tie 62 after installation. Thus, cable mount 10 and cable tie 62 may come pre-assembled, without concern that they will separate prior to deployment.

While certain embodiments of the present invention have been shown and described, it will be obvious to those skilled in the art that changes and modifications may be made. The matter set forth in the foregoing description and accompanying drawings is offered by way of illustration only and not as a limitation. The actual scope of the invention is intended to be defined in the following claims.

The invention claimed is:

1. A cable mount for receiving and carrying cable bundles, the cable mount comprising:
    a shaft comprising a top end portion and a bottom end portion, the shaft comprising a longitudinal axis;
    first and second adjacent projections spaced apart along the longitudinal axis and extending radially therefrom, each of the first and second adjacent projections extending from a first end to a second end with the first ends positioned on one side of the shaft and the second ends positioned on an opposite side of the shaft. wherein the first projection overlies at least a portion of the second projection and at least the first ends of the first and second adjacent projections are positioned at different locations relative to the longitudinal axis; and
    a cable tie receiving member comprising a top surface and opposing sidewalls defining a slot to receive a cable tie, said cable tie receiving member positioned at said top end portion of said shaft.

2. The cable mount of claim 1, wherein said first and second projections comprise a plurality of projections arranged in a row on said shaft.

3. The cable mount of claim 1, wherein said shaft further comprises a third projection overlying said second projection and aligned with said first projection.

4. The cable mount of claim 1, wherein said first and second projections comprise arcuate upwardly angled protrusions.

5. The cable mount of claim 1, wherein said first and second projections are circumferentially displaced about the longitudinal axis by between about 5 degrees and 20 degrees.

6. The cable mount of claim 1, wherein said cable tie receiving member comprises a retention tab for resisting movement of a cable tie positioned within said slot.

7. The cable mount of claim 1, wherein said top surface of said cable tie receiving member comprises a concave surface with raised outer edges and a flange.

8. The cable mount of claim 1, wherein said cable tie receiving member comprises raised outer edges connected by a bridge comprising opposing sidewalls. the raised outer edges and the opposing sidewalls defining one or more open spaces.

9. The cable mount of claim 1, further comprising a crown connected to said top end portion of said shaft and comprising a flexible disc extending outwardly from said shaft.

10. The cable mount of claim 9, wherein said crown comprises a frusto-conical shape.

11. The cable mount of claim 9, wherein a bottom portion of said crown comprises centering tabs for centering said cable mount within an aperture.

12. The cable mount of claim 1, further comprising a wedge positioned at the bottom end portion comprising opposing projections.

13. The cable mount of claim 12, wherein said wedge comprises a smaller width dimension than said first and second projections and a greater thickness than said first and second projections.

14. A cable mount for receiving and carrying cable bundles, the cable mount comprising:
    a shaft comprising a top end portion and a bottom end portion. the shaft comprising a longitudinal axis positioned within a plane extending along the shaft, the plane separating the shaft into a first side and a second side,
    a plurality of projections extending radially from the shaft, each projection extending circumferentially around a portion of the shaft between about 120 degrees and 160 degrees, said plurality of projections comprising first and second adjacent projections, each of said first and second adjacent projections extending from a first end to a second end, wherein the first projection overlies at least a portion of said second projection and at least the first ends of the first and second adjacent projections are positioned at different locations relative to the longitudinal axis; and
    a cable tie receiving member comprising a top surface and opposing sidewalls defining a slot to receive a cable tie, said cable tie receiving member positioned at said top end portion of said shaft.

15. The cable mount of claim 14, wherein said plurality of projections are arranged in a row on said shaft.

16. The cable mount of claim 14, wherein said plurality of projections further comprises a third projection overlying said second projection and aligned with said first projection.

17. The cable mount of claim 14, wherein said first and second projections comprise arcuate upwardly angled protrusions.

18. The cable mount of claim 14, wherein said cable tie receiving member comprises a retention tab for resisting movement of a cable tie positioned within said slot.

19. The cable mount of claim 14, wherein said top surface of said cable tie receiving member comprises a concave surface with raised outer edges and a flange.

20. The cable mount of claim 14, wherein said cable tie receiving member comprises raised outer edges connected by a bridge comprising opposing sidewalls. the raised outer edges and the opposing sidewalls defining one or more open spaces.

21. The cable mount of claim 14, further comprising a crown connected to said top end portion of said shaft and comprising a flexible disc extending outwardly from said shaft.

22. The cable mount of claim 21, wherein said crown comprises a frusto-conical shape.

23. The cable mount of claim 21, wherein a bottom portion of said crown comprises centering tabs for centering said cable mount within an aperture.

24. The cable mount of claim 14, further comprising a wedge positioned at the bottom end portion comprising opposing projections.

25. The cable mount of claim 24, wherein said wedge comprises a smaller width dimension than said first and second projections and a greater thickness than said first and second projections.

* * * * *